(12) United States Patent
Swanson (10) Patent No.: US 9,420,431 B2
(45) Date of Patent: Aug. 16, 2016

(54) VEHICLE TELEMATICS COMMUNICATION FOR PROVIDING HANDS-FREE WIRELESS COMMUNICATION

(75) Inventor: Steven Swanson, Commerce Township, MI (US)

(73) Assignee: General Motors LLC, Detroit, MI (US)

(*) Notice: Subject to any disclaimer, the term of this patent is extended or adjusted under 35 U.S.C. 154(b) by 902 days.

(21) Appl. No.: 13/042,837

(22) Filed: Mar. 8, 2011

(65) Prior Publication Data

US 2012/0231821 A1   Sep. 13, 2012

(51) Int. Cl.
*H04W 4/04* (2009.01)
*H04M 1/60* (2006.01)
*H04W 4/12* (2009.01)

(52) U.S. Cl.
CPC .......... *H04W 4/046* (2013.01); *H04W 4/12* (2013.01); *H04M 1/6075* (2013.01); *H04M 2201/40* (2013.01)

(58) Field of Classification Search
USPC .......... 455/466, 569.2, 575.2, 575.9, 550.1, 455/41.1–41.3, 563, 414.1; 345/853; 379/433.05, 520.04; 709/206
See application file for complete search history.

(56) References Cited

U.S. PATENT DOCUMENTS

| | | | |
|---|---|---|---|
| 8,238,526 B1* | 8/2012 | Seth | H04M 1/7255 379/88.11 |
| 2003/0125950 A1* | 7/2003 | Avila et al. | 704/260 |
| 2003/0126330 A1 | 7/2003 | Balasuriya | |
| 2004/0185800 A1 | 9/2004 | Van Bosch et al. | |
| 2005/0094775 A1 | 5/2005 | Smith, Jr. et al. | |
| 2005/0170869 A1* | 8/2005 | Slemmer et al. | 455/575.1 |
| 2005/0192061 A1* | 9/2005 | May et al. | 455/563 |
| 2005/0261035 A1 | 11/2005 | Groskreutz et al. | |
| 2006/0030298 A1* | 2/2006 | Burton et al. | 455/412.1 |
| 2010/0080365 A1* | 4/2010 | Seetharaman | H04M 1/7255 379/88.22 |
| 2010/0222086 A1* | 9/2010 | Schmidt | 455/466 |
| 2010/0298009 A1* | 11/2010 | Dantzler et al. | 455/466 |

* cited by examiner

*Primary Examiner* — Daniel Lai
(74) *Attorney, Agent, or Firm* — Christopher DeVries; Reising Ethington P.C.

(57) ABSTRACT

A system and method for providing a vehicle occupant with hands-free usage of text messaging services over a mobile phone via a vehicle telematics unit. The method enables a vehicle occupant to send and receive communication messages such as text messages in a hands-free manner. For sending text messages, a spoken communication message is received from the occupant at the vehicle and sent to a call center for conversion to a text message using a speech to text server. The converted text message is then sent to the mobile phone for texting to the intended recipient. Received text messages can be sent from the mobile phone to the telematics unit, converted to speech and played audibly to the occupant in the vehicle.

13 Claims, 3 Drawing Sheets

VEHICLE TELEMATICS COMMUNICATION FOR PROVIDING HANDS-FREE WIRELESS COMMUNICATION

TECHNICAL FIELD

The present invention relates generally to vehicle telematics services and, more specifically, to text messaging, communication between vehicles and mobile devices, and hands-free services provided by a vehicle to its operator or other occupant.

BACKGROUND OF THE INVENTION

Avoiding distractions and having both hands on steering wheel while driving are usually considered good driving habits. However, it is common for drivers to use their mobile phones while driving, sometimes to place or receive telephone calls, other times to enter or read textual messages or other information. Some vehicles are equipped with telematics units that include an embedded cellular phone and voice command interface for the driver to enable them to place and receive calls in a hands-free manner, thereby helping minimize driver distraction. However, many drivers still utilize their personal mobile devices (e.g., cell phone) while driving for such things as text messaging.

SUMMARY OF THE INVENTION

According to one embodiment of the invention, there is provided a method of using a vehicle telematics unit to provide a vehicle occupant with hands-free usage of text messaging services over a mobile communication device, comprising the steps of: (a) receiving a communication message at a vehicle telematics unit; (b) sending the received communication message to a call center from the vehicle telematics unit; (c) converting the communication message to a text message at the call center; and (d) sending the text message from the call center to an intended recipient via a mobile communication device.

According to another embodiment of the invention, there is provided a vehicle telematics unit for providing a vehicle occupant with hands-free usage of text messaging services over a mobile communication device. The telematics unit is wired into vehicle electronics located onboard the vehicle and includes a processor and memory programmed with computer readable instructions that are executed by the processor to carry out the steps of: (a) receiving a spoken communication message via a microphone located onboard the vehicle; (b) sending the received communication message to a call center from the vehicle; (c) receiving a text message back from the call center containing a textual representation of the spoken communication message; and (d) sending the text message to a mobile communication device for communication on to an intended recipient.

According to another embodiment of the invention, there is provided a method of using a vehicle telematics unit to provide a vehicle occupant with hands-free usage of text messaging services over a mobile communication device, comprising the steps of: (a) receiving a communication message at a mobile communication device located inside the vehicle; (b) transferring the communication message to the vehicle; and (c) presenting the communication message to an occupant of the vehicle via a vehicle user interface.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The methods described below provide a vehicle occupant with hands-free usage of text messaging services over a mobile communication device via a vehicle telematics unit. The exemplary methods described below enable a vehicle occupant to send and receive text messages or other communication messages in a hands-free manner. The vehicle telematics system is used to facilitate these tasks, as will be described below in greater detail.

Communications System

Figure 1:
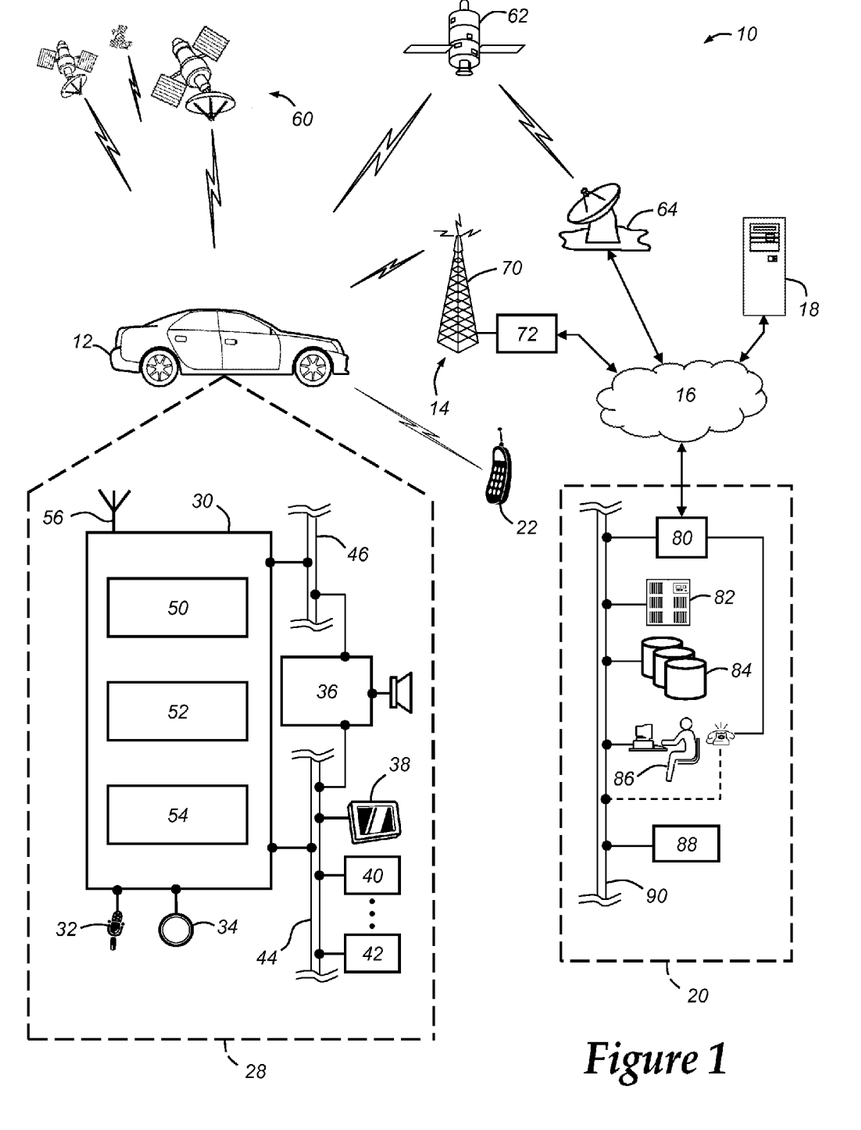
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is wired into the vehicle electronics 28 and that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. If used, the Bluetooth connection may employ any technology known by skilled artisans including frequency hopping spread spectrum, Gaussian frequency shift keying (GFSK), etc. In one such embodiment, the telematics unit 30 can be paired with a nearby device such as a mobile phone 22 using frequency hopping spread spectrum radio technology at the Industrial, Scientific and Medical (ISM) 2.4 GHz frequency band. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile communication device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone such as a cell phone that connects to a cellular network such as system 14. In another embodiment, mobile device 22 can be a personal digital assistant (PDA) that has wireless communication ability, but may or may not be equipped to provide telephony services itself. Mobile device 22 communicates wirelessly with the vehicle 12 by any suitable technology; for example, via a Bluetooth connection between the mobile device 22 and telematics unit 30. Other than mobile phones and PDAs, various other types of suitable processing devices can be used as the mobile device 22.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method

Figure 2:
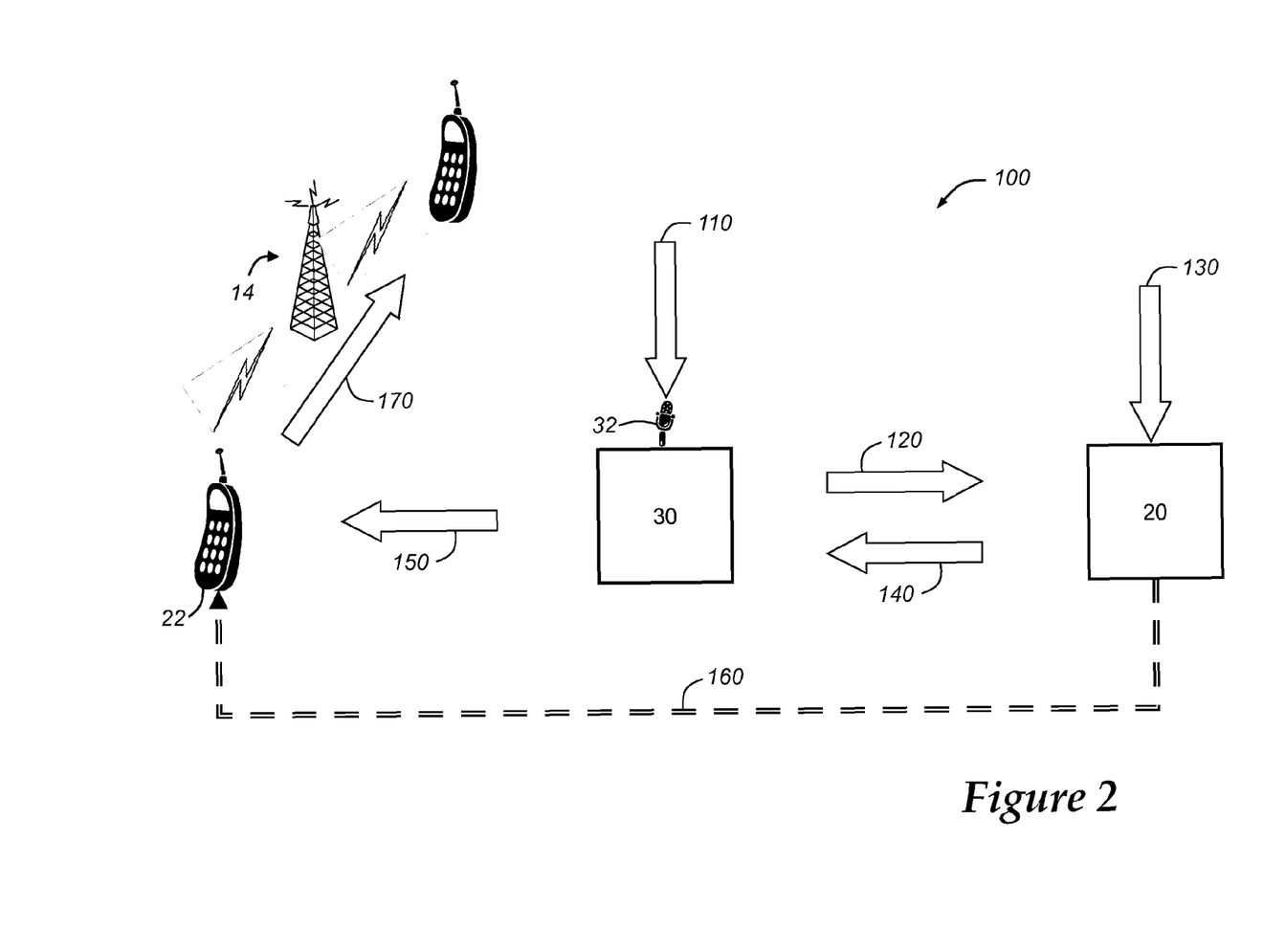
FIG. 2 is an illustrative diagram depicting one embodiment of a method of providing a vehicle occupant with hands-free usage of text messaging services over a mobile communication device.

Turning now to FIG. 2, there is shown a method 100 for providing a vehicle occupant with hands-free usage of text messaging services over a mobile communication device via a vehicle telematics unit. This can be used by an occupant of vehicle 12 to send a text message via their mobile device 22 without actually having to directly enter the message into the device and, in at least some embodiments, without having to even touch or directly interact with the mobile device 22. The method of FIG. 3 described further below provides a vehicle occupant with a means of receiving a text message sent to their mobile device that can be played or otherwise presented to the occupant via the vehicle, again for at least some embodiments, without having to touch or otherwise directly interact with the mobile device 22. These methods therefore provide a hands-free approach to text messaging that can be useful during driving of a vehicle to help minimize driver distraction. These methods can be carried out using suitable programming of the various FIG. 1 hardware devices used by the methods discussed below, and those skilled in the art will be aware of appropriate programming languages and software design approaches to be used in carrying out these methods.

The method 100 starts at step 110 where the vehicle telematics unit 30 receives a communication message. This message can take various forms and be received in various ways. For example, it can be received directly from the vehicle operator or other occupant via a vehicle user interface, such as speech inputted into the microphone 32, or indirectly via some other input device that then sends the communication message to the telematics unit 30. One example of this latter approach would be by speech input from the user into the mobile device 22 that then sends the speech to the telematics unit 30 via a Bluetooth connection or other wireless or wired connection. Receipt of the communication message by the telematics unit can be preceded by some command or other input to the telematics unit 30 to initiate the hands-free text message process of FIG. 2. For example, the occupant can press pushbutton 34 causing it to listen for voice input, following which the occupant can give a voice command or choose a menu option that instructs the telematics unit 30 to begin the hands-free text messaging process and wait for subsequent speech input. Alternatively, the telematics unit may be already be in a listening mode where it monitors for a particular word or phrase that initiates the process, without first requiring a button press. The process can include prompts from the telematics unit via its vehicle user interfaces (e.g., via visual display 38 or via the audio system 36 speakers or via a dedicated speaker), and this can be used for such things as to request an identification of the intended recipient of the communication message as well as the content of the message itself. For communication messages sent electronically to the telematics unit (e.g., via a Bluetooth connection from mobile device 22), the telematics unit can be programmed to monitor for such inputs automatically so that no separate manual initiation of the FIG. 2 process is needed other than the user causing the speech inputting into the mobile device to be sent to the telematics unit.

Identification of an intended recipient for the communication message can be carried out in any one or more of a number of different ways. For example, the intended recipient can be identified via speech input to the telematics unit 30 by specifying the mobile number of the intended recipient's mobile phone or by use of a nametag (e.g., "Bob's cell") that is associated in the telematics memory with a mobile number to be used or that is associated in the memory (contact list) of mobile device 22 with a mobile number to be used. Non-verbal ways of inputting the intended recipient or their mobile device number can also be used in addition to or instead of speech input. In some embodiments, the intended recipient need not be specified when the communication message is provided, such as where the system is setup to send the text message to a default recipient. This could be useful where the operator of vehicle 12 routinely sends the hands-free text messages to a specific person, such as his or her spouse.

Next, at step 120, method 100 sends the received communication message to a call center via the vehicle telematics unit. In one embodiment, method 100 records the communication message in memory 54 then it thereafter sends the recorded message to call center 20 via telematics unit 30. Another option would be to stream the audio to the call center via packet data while the user is speaking, without first waiting for the user to complete the utterance. In another embodiment, method 100 sends the communication message to call center 20 via telematics unit 30 without it being recorded. This could be done by initiating a voice call between the telematics unit 30 and call center 20 before receiving the spoken communication message. The occupant may optionally receive an acknowledgement message (e.g., via audio 36, display 38, etc.) from call center 20 confirming that the communication message was received and is being processed by call center 20. If the communication message is unclear, noisy, distorted, etc., a request can be made to have the occupant repeat the communication message. In some embodiments, pre-processing of received speech can be done before it is sent to the call center for such things as to reduce noise and enhance various attributes of the speech that may increase recognition.

Transmission of the communication message from the vehicle to the call center can be done in any suitable manner, such as via speech (whether live or recorded) over a voice channel connection or as data (e.g., as a digitized speech file) sent either over the voice channel using data transmission techniques discussed above or via a packet data connection.

At step 130, the call center 20 converts the communication message to a text message. This can be done using a server 82 which can either be a dedicated speech to text (STT) server or one that carries out multiple tasks including the speech to text conversion. Any one or more of a number of suitable speech recognition techniques may be employed by the server 82. In one embodiment, a hidden Markov models (HMMs) based technique is used to convert speech to text. Examples of the techniques that can be employed include dynamic time warping (DTW), vocal tract length normalization (VTLN), maximum likelihood linear regression (MLLR), heteroscedastic linear discriminate analysis (HLDA), maximum mutual information (MMI), minimum classification error (MCE), minimum phone error (MPE), etc. Skilled artisans will know of other suitable techniques to convert the spoken communication message to a text message.

Apart from converting the speech to text at the call center, various validation and other processes may be carried out before sending the text message on for final delivery to the intended recipient. For example, the text can be examined to determine whether it will meet applicable text messaging size limitations and, if so, the system can break the message into multiple sequential ones. Alternatively, the system can be designed to reject the message or take action to reduce the message length, for example, by replacing words with shortened phonetic equivalents or known or recognizable abbreviations or acronyms (e.g., shortening "for your information" to FYI, or "How are you?" to "how r u?"). This shortening of the message length can be done even in instances where the full message length is within the applicable size limit.

Once the communication message is converted to text it is then sent to the mobile device for transmission onto the intended recipient. This can be done either by first sending the message back to the telematics unit 30 from the call center 20 (step 140) and then from the telematics unit to the mobile device 22 (step 150), or by sending it directly to the mobile device 22 from the call center (step 160). An advantage of sending the text message either directly or indirectly to the mobile device 22 for re-transmission to the intended recipient is that it will then appear in the mobile device's outbox and will be received by the intended recipient as a communication from the mobile device 22 rather than from some other sender. This provides a seamless integration of hands-free text messages with those sent manually via keyed input directly on the mobile device 22.

Where the text message is relayed to the mobile device via the telematics unit (steps 140/150), the message can be sent to the telematics unit via a packet data connection, as data over a voice channel, via short message service (SMS) or a multimedia message service (MMS), or in any other suitable manner. Upon receipt of the converted text message, the telematics unit may then send it to the mobile device 22 over whatever electronic connection to the mobile device is available; e.g., via a short range wireless communication such as Bluetooth. Where the message is to be sent directly to the occupant's mobile device from the call center, the telematics unit can send to the call center both the speech to be converted and a mobile device identifier such as the mobile device's phone number so that the call center knows where to send the converted text message. The speech and mobile device number can be sent via a packet data connection, as data over a voice channel, via SMS or MMS, or in any other suitable manner, and each can be sent using the same or different approach. This direct sending of the converted text message from the call center 20 to the mobile device 22 permits the vehicle occupant to carry out a hands-free text message even when his or her mobile device is not present with the occupant in the vehicle. Thus, the mobile device can be located remotely from the vehicle (e.g., at the occupant's house or office) and yet the occupant can still send text messages via the mobile device. The choice between whether to send the converted text message to the mobile device either directly (step 160) or indirectly (steps 140/150) can be made in any suitable manner; for example, it can be specified by the occupant or can be determined automatically by the system. In one embodiment, this automatic determination can be to have the text message returned to the vehicle to be forwarded to the device (steps 140/150) if the vehicle has detected the mobile device 22 as being present at the vehicle and can be instead to have the text message sent directly to the mobile device (step 160) if it is not detected at the vehicle.

The converted text message can be sent along with an identification of the intended recipient; for example, the phone number of the recipient's mobile device or the recipient's name that can then be used to look up the proper device via a contact list stored in the mobile device or elsewhere. In some embodiments, that identification of the intended recipient can be included with the converted text message that is sent back from the call center; in other embodiments, it can be provided from the telematics unit 30. For example, in embodiments where the telematics unit 30 is being used both to send the communication message from step 110 to the call center 20 and to receive the converted text message back from the call center at step 140, the telematics unit can have the intended recipient's mobile number and can add that to the converted text message that is then passed by it to the mobile device at step 150. Or that mobile number can be provided separately to the mobile device before or after step 150. In this way, the system can utilize a remotely located speech to text server (e.g., server 82) yet maintain privacy of the intended recipient by not sending that information to the call center. Where the intended recipient's mobile number is stored only on the occupant's mobile device 22, that mobile number may need not even be provided to the telematics unit; for example, where the telematics unit provides a user interface to a contact list in the mobile device. In such an embodiment, the occupant can simply speak the name of the intended recipient from their contact list on the mobile phone (e.g., "Bob's cell") which is then converted by the vehicle telematics unit to text that is passed to the mobile device 22 to be used to look up the mobile number for Bob's cell so that the converted text message, when received by the mobile phone 22, can then be sent to Bob's cell using his mobile number. Again, this approach helps provide privacy since the recipient's mobile number is not sent to the call center or vehicle, while still obtaining the benefits of using a specialized speech to text server that has the processing power and resources needed to perform advanced speech recognition without the cost and complexity of trying to provide that service at each vehicle or mobile device.

At step 170, mobile device 22 sends the text message it now has onto the intended recipient. In one embodiment, mobile device 22 sends the text message as an SMS or an MMS to the intended recipient via the mobile device's native text messaging program so that it appears in the device's text messaging outbox and is seen by the recipient as having come from the sender's mobile device. Any known technology can be used to deliver the text message to its intended recipient including general packet radio service (GPRS), enhanced GPRS (EGPRS or EDGE), circuit switched data (CSD), high speed circuit switched data (HSCSD), or others over a wireless network including code division multiple access (CDMA), wideband CDMA (W-CDMA), time division multiple access (TDMA), global system for mobile communications (GSM), etc.

Implementation of the method 100 of FIG. 2 involves communication with mobile device 22 and, as such, involves the vehicle associating the communication message received in step 110 with the particular mobile device 22. In some embodiments, this association is to be determined regardless of whether the device 22 is present at the vehicle or not, and regardless of whether there are other mobile devices present at the vehicle. This identification and communication with the mobile device 22 can be carried out in or more of a number of ways. For example, the mobile device can be automatically identified upon pairing up with the vehicle over Bluetooth or whatever other wired or short range wireless communication technology is used. Alternatively, the vehicle operator or other user can go through an initial setup process in which the phone is identified to the vehicle as being the one to be used for any subsequent use of the hands-free text messaging process 100. As another option, the process can be initiated from the mobile device 22 itself by an input from the user to the device which is then relayed to the vehicle to start the FIG. 2 process, in which case the vehicle will know which mobile device it received the initiating instruction from and therefore which device is to be used in the hands-free text messaging process. Where one or more mobile devices are in electronic (wireless or wired) communication with the vehicle, the identification of the particular mobile device to be used for the hands-free text messaging process can be implemented via the vehicle user interfaces 32, 34, 36, and/or 38 as a part of initiating the process. For example, upon receiving an initiating input from an occupant indicating that he or she wishes to use the hands-free text messaging process, the telematics unit 30 can determine whether there is at least one mobile device available with which it can communicate. This can be determined based on an existing connection having already been established (e.g., by a pairing of the phone to the vehicle over Bluetooth when the occupant first entered the vehicle) or by searching for detectable mobile devices via Bluetooth or some other short range wireless communication technology. In such an embodiment, the system can then prompt the occupant with an appropriate message via audio system 36, a dedicated speaker, or via visual display 38. Where no mobile device is present, the prompt may request the occupant to identify what device should be used, and the vehicle and/or call center can then access this device via the wireless communication system 14. Where a mobile device is present via short range wireless communication, then a suitable device identifier can be obtained over this connection and used in the prompting; for example, by the message "Would you like to send the message via Andy's phone?" where "Andy's phone" is the mobile device name that has been previously assigned by the device's owner. If multiple mobile devices are present then the system can offer a choice among those devices via the prompts.

Figure 3:
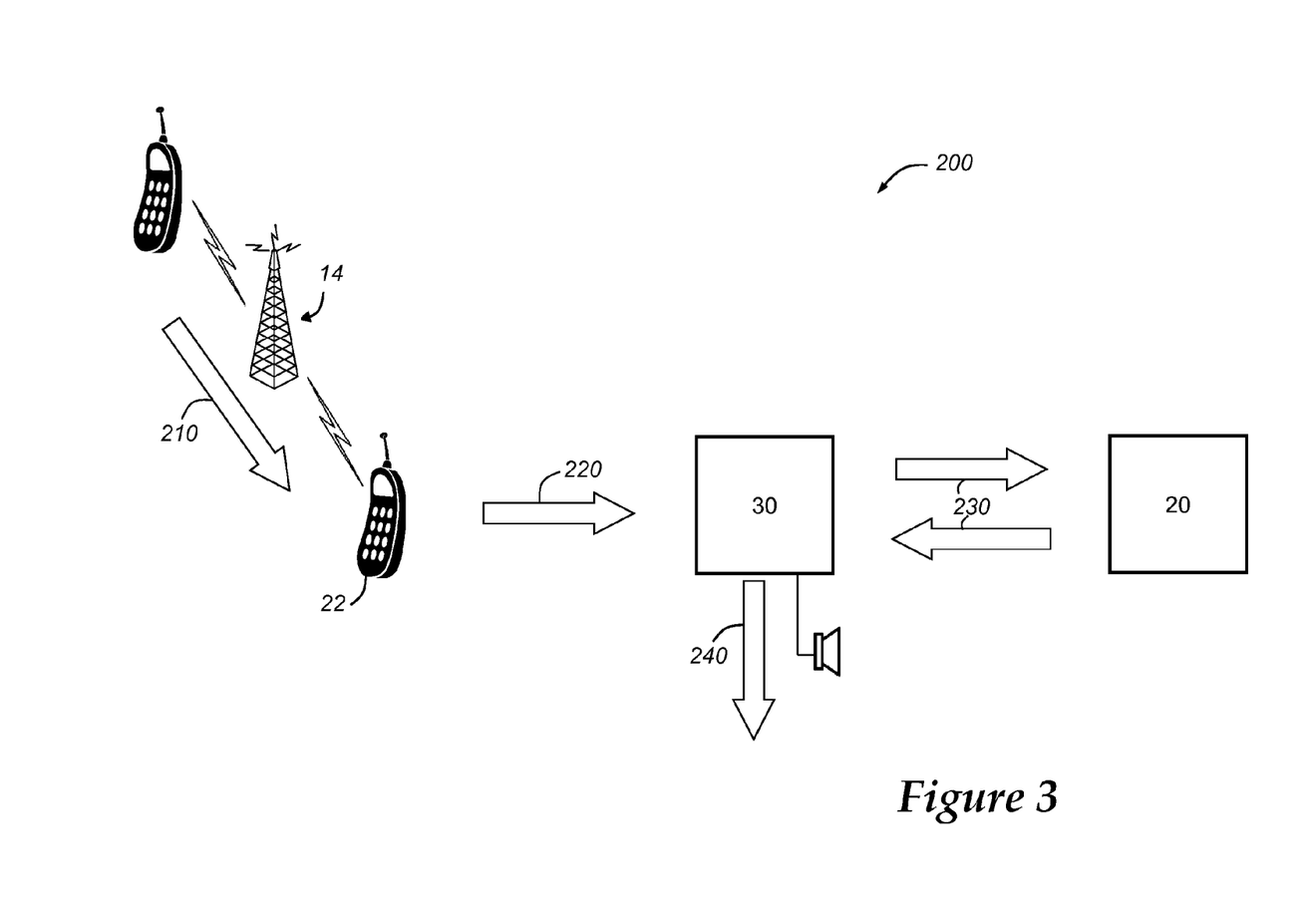
FIG. 3 is another illustrative diagram depicting another embodiment of a method of providing a vehicle occupant with hands-free usage of text messaging services over a mobile communication device.

Turning now to FIG. 3, method 200 depicts one embodiment of a method of providing a vehicle occupant with hands-free usage of text messaging services over a mobile communication device. This method can be used to present a text message received by a vehicle occupant on his or her mobile device 22 to the occupant in a hands-free manner. Beginning with step 210, the vehicle occupant receives a communication message at a mobile device located inside the vehicle. In one embodiment, mobile phone 22 which is located inside vehicle 12 receives a text message. The vehicle occupant can be notified about the new communication via a visual or audio alert played by mobile device 22. The occupant can perform a vocal command to telematics unit 30 via microphone 32 instructing the telematics unit to present the text message which may be done audibly, e.g., via audio system 36 and/or textually and/or graphically (for images, video) via visual display 38. In another embodiment, upon receipt by the mobile device 22, the mobile device communicates with the telematics unit automatically upon receipt of the message such that the telematics unit plays an audible alert for the occupant. In response, the occupant can authorize the message to be presented in the vehicle, either via spoken command to microphone 32 or via a press of pushbutton 34.

At step 220, the communication message is transferred from the mobile device to the vehicle telematics unit. In one embodiment, mobile device 22 is paired via a Bluetooth connection to telematics unit 30. Then, the communication message (e.g., text message) is transferred via this Bluetooth connection to telematics unit 30. Other embodiments are also possible. Information concerning the sender (e.g., the sender's name or mobile number) can be sent to the telematics unit along with the received text message.

At step 230, the text communication message is converted to an audio message. In one embodiment, the text message is converted to an audio message at vehicle 12. For instance, telematics unit 30 can include a software application that converts text to speech (TTS). This can be done using any technique suitable for producing synthesized speech. Or pre-stored actual speech or phonetic components can be used to generate the audio message. In another embodiment, the text message is sent via telematics unit 30 to call center 20 where it is converted to an audio message using again any suitable technique. In another embodiment, a live advisor can read the text message to the occupant or to create an audio recording of the text message that is then sent to the vehicle. Other embodiments are also possible. The sender's information (name, mobile number, or other information) can also be converted to speech at this time.

At step 240, the converted communication message is presented to the vehicle occupant. In one embodiment, a text message converted to an audio message by telematics unit 30 is played to the occupant over audio system 36. In another embodiment, live advisor 86 from call center 20 requests permission to read the text message to the occupant of vehicle 12 via telematics unit 30. In a third embodiment, an audio recording (audio file) of the converted text message from the call center is played to the occupant. Skilled artisans will recognize that other embodiments are also possible.

To carry out the interaction between the mobile device 22 with the telematics unit 30 and, in some embodiments, with the call center 20, the mobile device can include suitable programming to receive and relay the text messages via its default text messaging software. For example, in some embodiments, the programming can be built into the core operating system software of the mobile device or into the text messaging program used by the device. In other embodiments, a separate application (e.g., an "app") can be loaded onto the mobile device that is programmed to receive the converted text messages from the vehicle and/or call center and then send them to the intended recipient via the device's text messaging program. And, such a program can also take received text messages and forward them to the vehicle to be presented to the occupant, either audibly or visually, to thereby carry out the FIG. 3 method described above. In yet other embodiments, a standalone text messaging program can be used that is separate from the default one used by the mobile device, and this standalone program can carry out the functions of receiving a text message from the vehicle or call center to be forwarded to an intended recipient. Suitable programming techniques for implementing the desired programming of the mobile device will be known to those skilled in the art; for example, programming of an iPhone™ using the Apple™ SDK and Cocoa™ programming language.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the telematics unit can be implemented using different modules on the vehicle that perform different ones or parts of the various functions described above. For example, one module of the telematics unit could handle short range communication with the occupant's mobile device, a second module can handle the vehicle user interfaces, including speech recognition and speech synthesis, with a third module of the telematics unit handling wireless communication with the call center via a cellular or other wireless communication system. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of using a vehicle telematics unit to provide a vehicle occupant with hands-free usage of text messaging services over a mobile communication device, comprising the steps of:
   (a) receiving a communication message at a vehicle telematics unit;
   (b) sending the received communication message to a call center from the vehicle telematics unit;
   (c) converting the communication message to a text message at the call center;
   (d) providing the text message to a mobile communication device; and
   (e) sending the text message to an intended recipient via the mobile communication device.

2. The method of claim 1, wherein step (a) comprises the step of receiving the communication message at the telematics unit as speech received from a vehicle occupant via a vehicle user interface.

3. The method of claim 2, wherein step (a) further comprises receiving an input from the occupant indicating that hands-free text messaging is desired, and further including receiving from the occupant an identification of the intended recipient via speech input to the vehicle user interface.

4. The method of claim 1, wherein the text message comprises text only or text and multimedia content.

5. The method of claim 1, wherein step (d) further comprises sending the text message from the call center to the vehicle via the telematics unit, then from the vehicle to the mobile communication device, and then from the mobile communication device to the intended recipient.

6. The method of claim 5, further comprising the steps of receiving an identification of the intended recipient via a vehicle user interface and sending the identification to the mobile communication device, wherein step (d) further comprises sending the text message from the mobile communication device to the intended recipient using the identification received via the vehicle user interface.

7. The method of claim 1, wherein step (a) further comprises the step of receiving the communication message from the mobile communication device as speech that was initially received by the mobile communication device and then sent wirelessly from the mobile communication device to the vehicle telematics unit.

8. The method of claim 1, wherein the mobile communication device is a mobile phone located remotely from the vehicle, and wherein step (d) further comprises sending the text message directly from the call center to the mobile phone and then sending the text message from the mobile phone to the intended recipient.

9. A vehicle telematics unit for providing a vehicle occupant with hands-free usage of text messaging services over a mobile communication device, wherein the telematics unit is wired into vehicle electronics located onboard the vehicle and includes a processor and memory programmed with computer readable instructions that are executed by the processor to carry out the steps of:
   (a) receiving a spoken communication message via a microphone located onboard the vehicle;
   (b) sending the received communication message to a call center from the vehicle;
   (c) receiving, at the vehicle telematics unit, a text message back from the call center containing a textual representation of the spoken communication message; and
   (d) sending the text message to a mobile communication device so that the mobile communication device will wirelessly send the text message on to an intended recipient.

10. A vehicle telematics unit as defined in claim 9, wherein the telematics unit includes computer readable instructions that are executed by the processor to obtain from an occupant of the vehicle both the spoken communication message and an identification of the intended recipient.

11. A vehicle telematics unit as defined in claim 10, wherein the telematics unit includes computer readable instructions that are executed by the processor to send the identification of the intended recipient to the mobile communication device.

12. A vehicle telematics unit as defined in claim 9, wherein the telematics unit includes computer readable instructions that are executed by the processor to receive an incoming text message from the mobile communication device, convert the incoming text message to an audio message, and play the audio message in the vehicle.

13. A vehicle telematics unit as defined in claim 12, wherein the telematics unit includes computer readable instructions that are executed by the processor to alert an occupant of the vehicle of the incoming text message via a vehicle user interface prior to playing the audio message in the vehicle.

* * * * *